Dec. 14, 1937.  M. SMOLENSKY  2,102,289

DIRECT FLOW CHECK VALVE

Filed Oct. 10, 1933  2 Sheets-Sheet 1

Inventor

Michael Smolensky

By Soule & Leonard

Attorneys

Patented Dec. 14, 1937

2,102,289

UNITED STATES PATENT OFFICE 2,102,289

DIRECT FLOW CHECK VALVE

Michael Smolensky, Cleveland, Ohio

Application October 10, 1933, Serial No. 692,974

2 Claims. (Cl. 251—144)

This invention relates to check valves and is a continuation in part of the subject matter of my copending application Serial No. 449,427, filed May 3, 1930, and now Patent No. 1,950,575, granted March 13, 1934.

The primary object of my invention is to provide a check valve through which the fluid may pass in a smooth, direct and unregurgitated stream from the inlet to the outlet passage so as to reduce the head losses and backwash of the fluid stream.

A correlative object is to prevent abrupt radial flow of fluids in the rear of the valve disk and to gradually direct the fluid passing the valve into a path coaxial with the outlet passage so as to obtain a streamline flow effect.

Another object is to provide a valve in which effective areas of the inlet passage and of outlet passages are each equal to or greater than the area of the corresponding passages of the pipes with which the valve is associated.

Another object of my invention is to provide a check valve which may be economically manufactured and assembled and which is comparatively small in proportion to the other check valves of comparable capacity.

Specific and important features of my invention reside in the manner in which the fluid impinging upon the valve disk is redirected into the main stream and in the manner in which the fluid is guided to the discharge passage after it has passed around the rim of the valve disk.

Other objects and advantages of my invention will become apparent from the following specification wherein reference is made to the drawings by the use of numerals.

Figure 1:
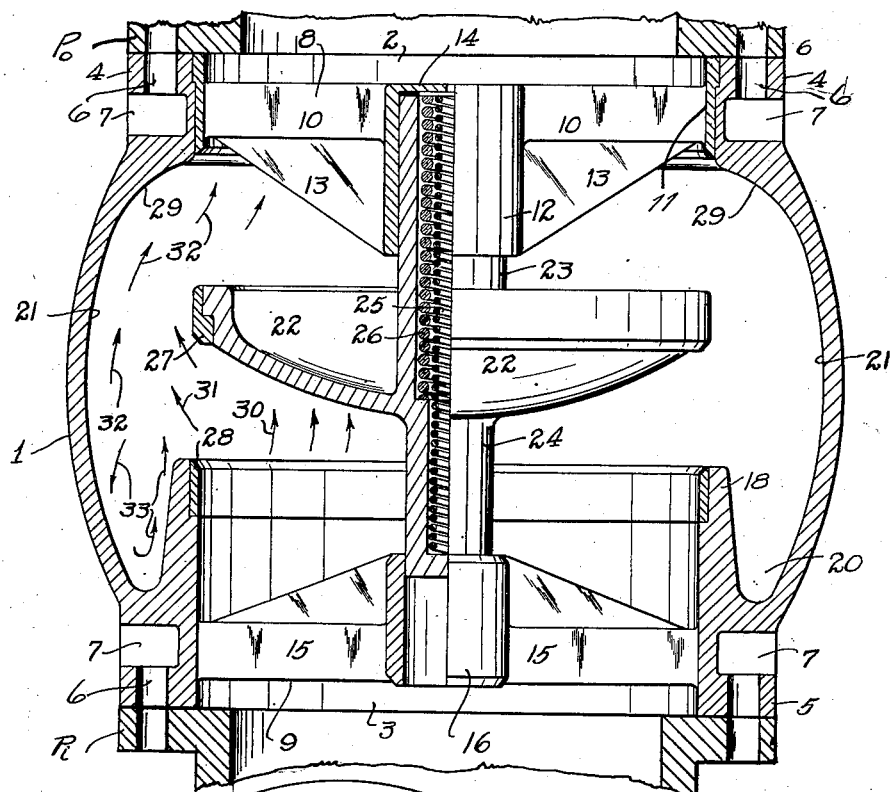
Fig. 1 is a longitudinal sectional view through the form of check valve embodying principles of my invention.
Figure 2:
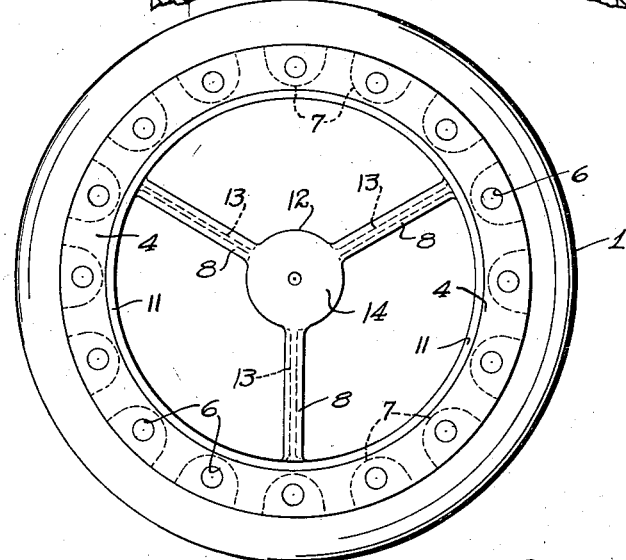
Fig. 2 is a plan view of the valve illustrated in Fig. 1.
Figure 3:
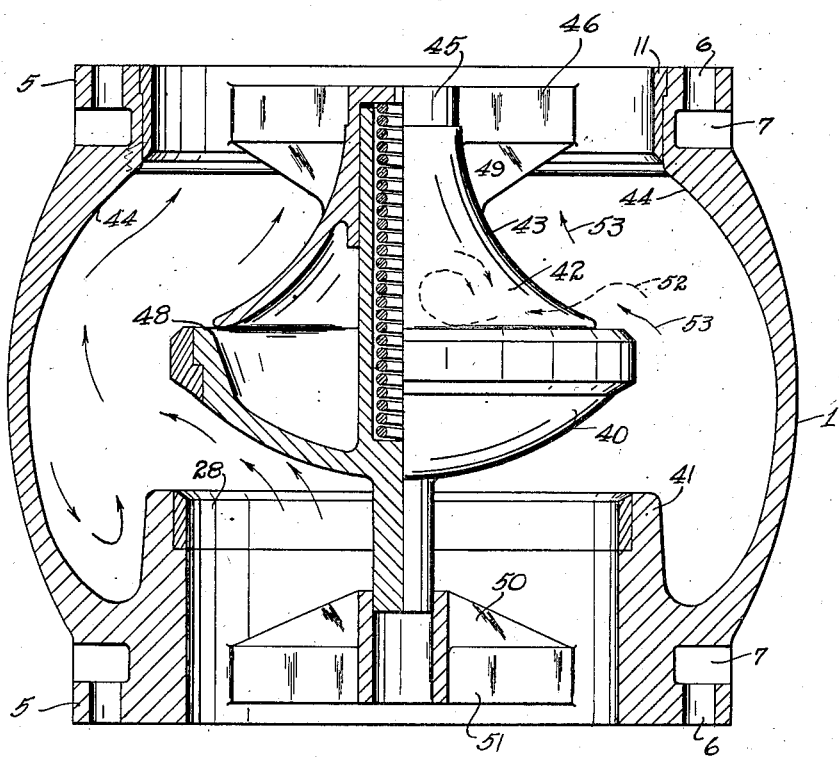
Fig. 3 is a longitudinal sectional view showing an improved form of the valve illustrated in Fig. 1.

The valve illustrated in Figs. 1 and 2 is a continuation in part of the subject matter of my copending application above identified. The valve illustrated in Fig. 3 is a similar valve with an improved means for guiding the fluid through the valve body after it has passed the rim of the valve disk.

Referring to Figs. 1 and 2, the valve comprises a body 1 having outlet and inlet passages 2 and 3 respectively which are preferably coaxial with each other. About the ends of the valve and the respective passages are provided thickened annular portions 4 and 5 tapped as indicated at 6 to receive bolts for connecting the body between companion flanges carried on adjacent ends of the pipe line in which the valve is to be installed. Radial recesses 7 are formed in the annular portions to accommodate bolt heads or companion nuts of the bolts passing through the passages 6. The valve body is slightly larger in diameter than the pipe with which it is associated for purposes later to be described.

At the ends of the valve body within the annular portions 4 and 5 are spiders 8 and 9 respectively. The spider 8 which is removable from the body for purposes of assemblage, comprises a number of radial ribs 10 terminating outwardly in an annular rim 11 adapted to be fitted and secured against a suitable shoulder in the annular portion 4 of the body. The inner ends of the ribs 10 support a central tubular bearing 12 and carry fins 13 projecting inwardly of the valve body and extending from the inner end of the bearing 12 and sloping outwardly to the plane of the lower edge of the ribs 10, for bracing the bearing securely in position and for assisting in directing the fluids in a straight path into an outlet passage 2. The bearing 12 may be partially closed at its outer end by a wall 14. The spider 9 is formed similarly to the spider 8, except that the arms 15 thereof may be integral with the body. As illustrated, the spider 9 supports a tubular bearing 16 coaxial with the bearing 12 and the arms thereof also carry inwardly projecting bracing and guide fins.

Extending inwardly of the body and surrounding the inlet opening of the valve is a crown 18 which is of substantially the same inner diameter as the inlet passage and is in spaced relation to the walls of the valve body. The crown 18 and inner walls of the body form an annular trough 20 of considerable depth adjacent to the inlet end of the body. The inner walls 21 of the body are preferably concave inwardly so as to define a globular cavity. The trough 20 therefore is wider at the top than at the bottom for a purpose later to be described.

Within the valve body is a closure disk 22, carried on posts 23 and 24 extending in each direction from the face of the disk. These posts are adapted to be received in the bearings 12 and 16 respectively, for slidably mounting the posts and disk and for retaining the disk in axial alignment with the inlet opening. The posts 23 and 24 are preferably hollow so as to receive springs 25 and 26 which abut the wall 14 in the bearing 12 at one end. The spring 26 engages a suitable shoulder in the post 23 at the other end and the spring 25 engages an end wall in the post 24. These springs operate to return the valve to seated position and are protected against foreign matter by the telescopic housing thus formed by the posts 23 and 24 and bearings 12 and 16. The disk 22 is preferably convex toward the crown 18 and preferably globular in form and of substantially the same outer diameter as the crown 18. The diameter of the disk relative to the body is such that when the disk is in the open position, the annular passage between the disk rim and the walls of the body is about equal in area to the passage through the inlet opening.

In the form illustrated, the disk is hollow on the side away from the inlet opening so as to reduce the weight and permit more rapid seating and unseating of the disk. The inner walls 21 of the body slope inwardly as indicated at 29, beginning a short distance past the open position of the disk so as to approach, on a gradual curve, the outlet passage.

In operating, the water or other fluid entering the valve, impinges on the globular face of the disk 22 and unseats the disk, driving it away from the inlet opening against the resistance of the springs 25 and 26. This action of the disk is finally arrested in case of swift flow of water by engagement of the post 23 and the end wall of the bearing 12 or by compression of the springs to a given pressure.

When the disk is in the full open position as indicated in Fig. 1, the fluid passes out from the inlet opening and the bore of the crown 18 as indicated by the arrows 30. Since the face of the disk slopes away from the passage toward the circumference, the larger portion of this fluid forms an annular stream passing gradually outwardly toward the walls of the body and generally parallel to the face of the disk 22, as indicated by the arrows 31. This fluid is gradually deflected inwardly by the body walls as indicated by the arrows 32 toward the outlet opening so that a comparatively solid annular stream of water passes around the valve and forms into a solid stream as it goes through the outlet passage. However, there is a tendency for back-wash and regurgitation of the fluid as it impinges upon the face of the valve disk. Due to the depth and position of the trough 20 and the slope of the face of the disk positioned toward the inlet opening and crown, part of the fluid is directed outwardly toward the walls 21 of the body. This portion of the fluid would normally tend to regurgitate and cause backwash, except for the action of the trough 20. However, when the trough 20 is provided, this stream of fluid striking the walls 21 tends to flow downwardly into the trough and is redirected parallel to the axis of the crown and back into the main stream, as indicated by the arrows 33. The trough becomes filled immediately upon the entrance of the fluid and before the valve disk is fully withdrawn from the opening in the inlet passage. Since the trough is filled, it presents a solid mass of fluid in which the currents are flowing as indicated, thus partially reducing the backwash and eliminating losses of fluid head. After the trough is well filled with fluid, the fluid passing between the disk and crown flows outwardly and upwardly striking this returning stream and being deflected thereby and passing therewith up and around the valve disk until substantially a solid direct stream of fluid flowing in a gradual curve around the valve disk and along the side walls of the body is formed.

A valve similar in most respects to that shown in Fig. 1, but with improved means for directing the fluid in a clearly defined stream to the outlet passage after passing the valve disk is illustrated in Fig. 3. In this form of valve, the disk 40 is convex toward the crown 41 and preferably globular in form for effecting the flow of water similar to that previously described.

In order to better direct the flow of fluids into the outlet passage, I provide an element 42 having a fluid directing surface designated at 43 designed to form with the inner walls 44 of the body, an inwardly directed annular passage coaxial with the outlet passage. In the form illustrated, the element 42 is roughly a frusto-conical shield, disposed with the larger base turned toward the valve disk, and the smaller base toward the outlet passage of the valve body.

In the preferred form, the diameter of the shield adjacent to the valve disk, is substantially the same as the diameter of the rim of the disk 40, and the other base of the shield is substantially the same diameter as the tubular bearing 45. When used in the form of body illustrated, the fluid engaging wall 43 slopes inwardly from the lower base toward the upper base of a gradual curve, the degree of curvature depending on the slope of the inner walls 44 of the valve body adjacent to the discharge end. The degree of curvature illustrated is effective throughout a large range of shapes of valve bodies, and will give effective results in all of them. If the body were substantially cylindrical, the radius of curvature may be increased or a cylindrical shield with the upper end tapered or a conical shield could be used with good results.

For economy in manufacture, the shield may be formed hollow and integral with the post 45 and spider arms 46 of the removable spider which is fixedly secured in the body. When the shield is thus fixed to the body, the lower end terminates in the plane defined by the rearward face of the valve disk, when the valve disk is in a fully open position, as indicated at 48. Thus, when the valve disk is in a fully open position, there is presented to the fluid passing through the valve and around the valve disk, a smooth-walled annular passage of decreasing inner radius toward the outlet passage so that the fluid may pass as a solid unregurgitated annular stream through the valve body and outlet passage, past the end of the shield 42. During this passage, it is gradually brought from a solid annular stream, to a solid circular stream and concurrently gradually directed axially of the outlet passage. The large diameter end of the element or shield 42 preferably passes into the plane of the valve disk substantially tangentially so that fluid impinging upon the inner walls of the body and tending to pass somewhat radially and abruptly inwardly thereof strikes the shield without regurgitation or backwash and are gradually deflected in the manner described. Thus, the disk and shield cooperate when the disk is in the open position, to form a smooth stream line valve plug. In some cases, it may be desirable that the shield be carried directly on the valve disk and slidably engage the post 45, though the present form and arrangement appears to produce a better and more efficient flow.

Assuming that the fluid is passing around the rim of the disk 40, having been directed in a solid stream by the action of the crown 41 and side walls 44 of the body, a part of the fluid tends to turn inwardly after passing the rim of the disk and, in case of the disk shown in Fig. 1, there is a tendency for backwashing in the rear of the disk. With the shield provided however, the fluid which might otherwise flow radially inwardly past the rim of the disk and cause regurgitation, as indicated by the dotted arrows 52, is gradually deflected, without regurgitation, and guided into a direction axially of the outlet passage, as indicated by the arrows 53. Any tendency of the flowing stream to form into a swirling moving stream is overcome by the downwardly extending fins 49 of the spider arms 46. A similar effect is provided by the fins of the inlet passage of the valve. By making the walls of the shield curvilinear, a gradual contraction of the stream of fluid from an annular to a circular stream results and causes a streamline effect for assisting the flow.

Experience has proven that in order to render these valves most effective, the inlet passages and the outlet passages each should be equal to or greater in effective cross sectional area than the pipe with which associated. Since the spiders block a portion of these passages, allowance must be made therefor in determining these areas. Referring, for example, to Fig. 1, the valve is shown connected to an inlet pipe Pi and an outlet pipe Po. The areas of the pipes respectively equal Ai and Ao. The area of the spider arms 9 plus the annular rim 11, plus the bearing 14, taken in the plane of the outlet passage equal As. The outlet passage area therefore must be equal to or greater than Ao and As. The same is true of the inlet passage which must be equal to or greater than Ai plus area of bearing 16 plus area of arms 9, taken in the plane of the inlet passage.

In this manner, I have provided a check valve having a large smooth wall passage which permits the flow of fluid therethrough in substantially a solid well defined stream without regurgitation and backwash, and have provided means which cooperate with the walls of the body of the valve and with the disk to cause any fluid which would normally regurgitate and backwash to localize into a defined stream which is directed with very slight head losses into the main stream passing through the valve.

Having thus described my invention,

I claim:

1. A check valve comprising a one piece body arranged for connection with pipes at its ends and having a chamber therein of circular cross section and axially aligned entrance and exit passages at the opposite ends of the chamber respectively, a crown about the entrance passage extending into the chamber and defining with the walls thereof a relatively deep annular trough, a closure disk seatable on said crown and movable toward and away from said crown for opening and closing the valve, a spider in the entrance passage, a bearing carried by the spider, a detachable spider in the exit passage, a bearing carried thereby and coaxial with the first bearing, posts on the disk slidably accommodated by said bearings, a shield integral with the bearing in the exit passage and extending therefrom into the chamber in spaced relation to the walls thereof and flaring radially outwardly toward the disk and terminating at its larger end substantially flush with the limit of the disk nearest the exit passage when the disk is in fully opened position, and a compression spring operatively interposed between the disk and detachable spider and urging the disk to seated position on the crown.

2. A check valve comprising a one piece body arranged for connection with pipes at its ends and having a chamber therein of circular cross section and axially aligned entrance and exit passages at the opposite ends of the chamber respectively, a valve seat within the chamber, a closure disc seatable thereon and movable toward and away from said seat for opening and closing the valve, a spider in the entrance passage, a bearing carried by the spider, a detachable spider in the exit passage, a bearing carried thereby and coaxial with the first bearing, posts on the disc slidably accommodated by said bearings, a shield integral with the bearing in the exit passage and extending therefrom into the chamber in spaced relation to the walls thereof and flaring radially outwardly toward the disc and terminating at its larger end substantially flush with the limit of the disc nearest the exit passage when the disc is in fully opened position, and a compression spring operatively interposed between the disc and detachable spider and urging the disc to seated position.

MICHAEL SMOLENSKY.